(No Model.)
E. PHILLIPS.
WRENCH.
No. 331,158. Patented Nov. 24, 1885.
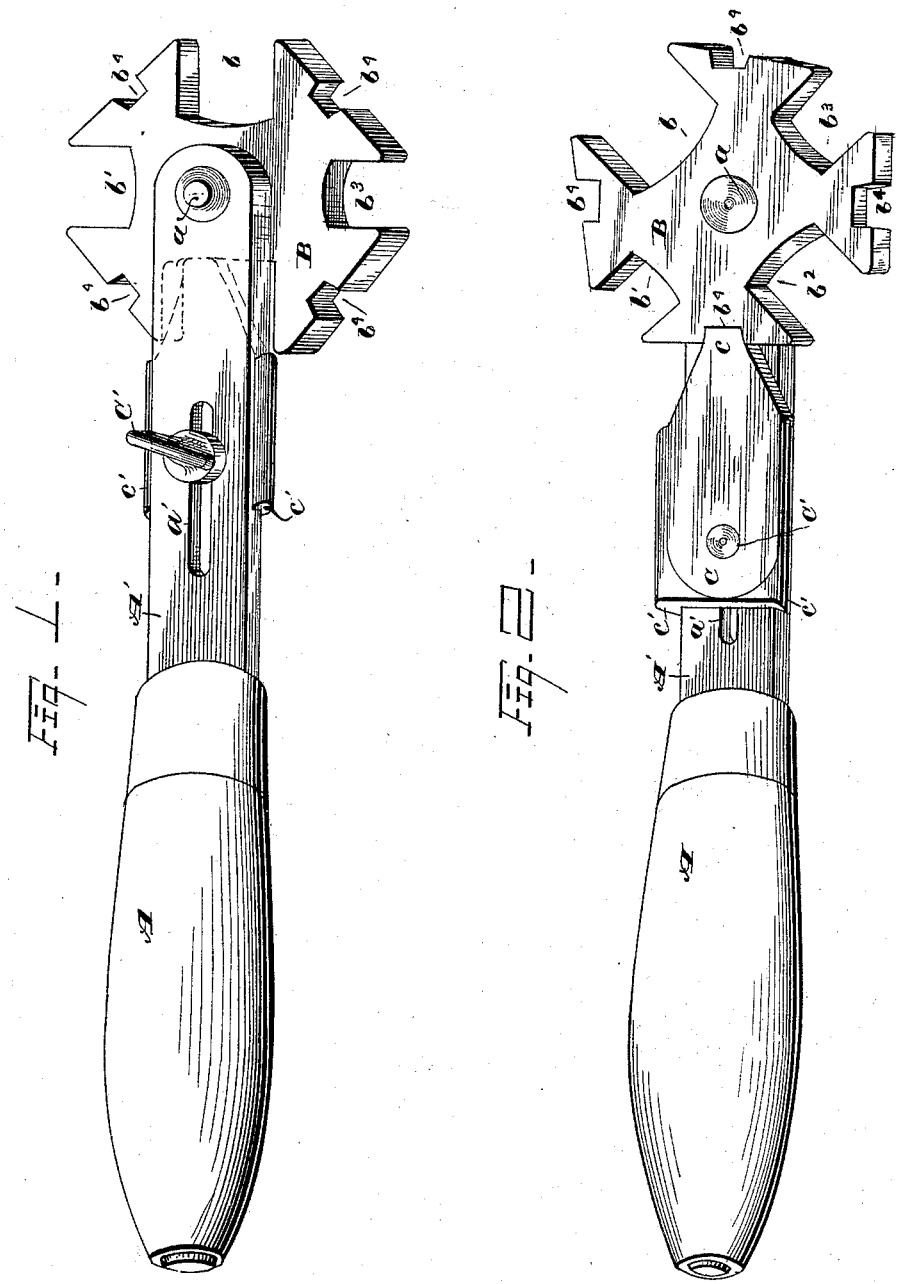
WITNESSES
Wm. M. Monroe,
Geo. W. King
INVENTOR
Edward Phillips
Liggett and Liggett
Attorneys

UNITED STATES PATENT OFFICE.

EDWARD PHILLIPS, OF CLEVELAND, OHIO, ASSIGNOR OF ONE-HALF TO THEODORE F. BEIDLER, OF SAME PLACE.

WRENCH.

SPECIFICATION forming part of Letters Patent No. 331,158, dated November 24, 1885.

Application filed September 15, 1885. Serial No. 177,137. (No model.)

*To all whom it may concern:*

Be it known that I, EDWARD PHILLIPS, of Cleveland, in the county of Cuyahoga and State of Ohio, have invented certain new and useful Improvements in Wrenches; and I do hereby declare the following to be a full, clear, and exact description of the invention, such as will enable others skilled in the art to which it pertains to make and use the same.

My invention relates to improvements in wrenches in which a revolving head is pivoted to the handle, said head having a series of notches on the periphery, said notches being of different sizes to fit different-sized nuts, with a sliding dog attached to the handle and secured by a thumb-screw, said dog being arranged to engage one of the notches in the head and hold the head in the desired position, to the end that a cheap, simple, strong, and durable wrench is had.

In the accompanying drawings, Figures 1 and 2 are views in perspective of my improved wrench, showing the wrench, respectively, in reversed positions, and with the head held at different angles.

A represents the handle of the wrench; A', the shank, and B the head. The head is pivoted on and secured to the shank by a large rivet, $a$. The head B is provided with notches $b$, $b'$, $b^2$, and $b^3$, and between these notches are smaller notches $b^4$.

C is a sliding dog, that at the extreme end, $c$, terminates in a tongue small enough to enter the notches $b^4$. Back of the point $c$ the edges of the dog diverge abruptly, so that these edges would fill the mouth of any of the larger notches $b$ $b'$, &c., and would prevent the head from turning. The handle is provided with a slot, $a'$, and a thumb-screw, C', passes through this slot and screws into the dog. By loosening this thumb-screw the dog may be slid toward the handle far enough to be disengaged from the head. The head can then be turned at any angle desired, after which the dog is slid toward the head, so as to engage one of the notches, and is fastened by the thumb-screw. If the dog engages one of the larger notches, the other three large notches will be exposed, one in line with the handle and the other two at right angles to the handle.

As is frequently the case, it is more convenient to have the notch that is being used at an angle of forty-five degrees to the handle, as shown in Fig. 2, in which case the dog engages one of the smaller notches.

The small notches, if preferred, may be made of different sizes and depths, so that they too may be utilized for light work. It is frequently necessary to turn a nut where, owing to the limited space, it would be difficult to operate a wrench. Now, with this wrench, as you may set any sized notch that is being used in seven different positions, it is evident that the nut can be turned under very unfavorable circumstances.

It will be observed that in Fig. 1 the larger notches are exposed in three different positions, and consequently either of these notches may in turn be placed in each of these three positions, and in Fig. 2 the larger notches are exposed in four different positions, so that in all any one notch may be placed in seven different positions, if necessary, to turn a nut; consequently a nut can be turned a trifle with the head in one position; then by releasing the dog the handle may be drawn to the one side, so that the head will be turned one-eighth of a revolution relative to the handle and another turn given to the nut, and so on, so that where there is room to swing the handle one-eighth of a turn there is room to work a nut.

The wrench is simple, strong, durable, and can be made at a small initial cost.

The lips $c'$ of the dog, that embrace the edges of the shank A', may, if preferred, be undercut, and the edges of the shank beveled to correspond, so as to form a dovetail, in which case the dog will be slid onto the shank before the head is attached.

I am aware of the wrench shown and described in United States Patent No. 13,120. The objections to this wrench are that it is expensive to make and is easily broken, the pin that holds the head from turning being so near the center of said head that a great leverage is had against this pin; also, the extra holes in the head to accommodate the pin weaken the head. For these reasons this wrench has never come into general use.

With my improved device the locking is done on the periphery of the head, which alone is a great improvement on the former device patented as aforesaid.

What I claim is—

1. In a wrench, the combination, with a head pivoted to the outside of the shank or handle of the wrench, said head having a series of notches on the periphery adapted, respectively, to engage nuts, of a dog attached to the handle, for engaging the said notches on the periphery of the head to hold the head in the desired position, substantially as set forth.

2. In a wrench, the combination, with a revolving head pivoted to the handle, said head having a series of graduated notches on the periphery thereof, of a sliding dog arranged upon the handle to engage the respective notches on the periphery of the head, a thumb-screw for fastening the dog, substantially as set forth.

In testimony whereof I sign this specification, in the presence of two witnesses, this 28th day of August, 1885.

EDWARD PHILLIPS.

Witnesses:
CHAS. H. DORER.
ALBERT E. LYNCH.